US012726736B2

(12) United States Patent
Yokoyama et al.

(10) Patent No.: US 12,726,736 B2
(45) Date of Patent: Sep. 1, 2026

(54) PHOTOELECTRIC CONVERSION DEVICE, MOVABLE APPARATUS, PROCESSING METHOD, AND STORAGE MEDIUM FOR GENERATING A DIFFERENTIAL IMAGE

(71) Applicant: CANON KABUSHIKI KAISHA, Tokyo (JP)

(72) Inventors: Junya Yokoyama, Tokyo (JP); Soya Fujimori, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 56 days.

(21) Appl. No.: 18/824,961

(22) Filed: Sep. 5, 2024

(65) Prior Publication Data

US 2025/0113119 A1 Apr. 3, 2025

(30) Foreign Application Priority Data

Sep. 28, 2023 (JP) ................................ 2023-168578

(51) Int. Cl.
*H04N 23/61* (2023.01)
*G06V 20/58* (2022.01)
(Continued)

(52) U.S. Cl.
CPC ......... *H04N 25/7795* (2023.01); *H04N 23/61* (2023.01); *G06V 20/58* (2022.01)

(58) Field of Classification Search
CPC .. H04N 23/61; H04N 25/7795; H04N 25/773; H04N 25/78; H04N 25/79; G06V 20/56; H10F 30/225; H10F 77/959
See application file for complete search history.

(56) References Cited

U.S. PATENT DOCUMENTS 10,652,494 B2 * 5/2020 Saito .................. H04N 25/7795
11,846,542 B2 * 12/2023 Yamazaki ............ H04N 25/773
(Continued)

FOREIGN PATENT DOCUMENTS

JP 7223070 B2 2/2023

OTHER PUBLICATIONS

Extended European Search Report issued by the European Patent Office on Jan. 21, 2025 in corresponding EP Patent Application No. 24199137.1.

*Primary Examiner* — Marly S Camargo
(74) *Attorney, Agent, or Firm* — Carter, DeLuca & Farrell LLP

(57) ABSTRACT

A photoelectric conversion device according to one embodiment of the present disclosure has a plurality of pixels, a control unit, and a generating unit. Each pixel of the plurality of pixels includes a sensor unit that emits a pulse at a frequency corresponding to a photon reception frequency, a first counter and a second counter that count a number of the pulses, and a first memory that stores the count value for the first counter, and a second memory that stores the count value for the second counter. The control unit controls the plurality of pixels such that during a read-out operation for the count values that have been accumulated during a plurality of different accumulation periods within a full frame period from each of the first counter and the second counter, a count value for a first accumulation period is read out before an end time of a second accumulation period that is longer than the first accumulation period, and performs control such that a read-out timing for each accumulation period becomes different between the first counter and the second counter. The generating unit generates a differential image based on a difference in signals corresponding to the
(Continued)

count values that are output from the first memory and the second memory respectively.

10 Claims, 11 Drawing Sheets

(51) Int. Cl.

| | |
|---|---|
| ***H04N 25/76*** | (2023.01) |
| ***H04N 25/773*** | (2023.01) |
| ***H04N 25/78*** | (2023.01) |
| ***H10F 30/225*** | (2025.01) |

(56) References Cited

U.S. PATENT DOCUMENTS

| | | | | |
|---|---|---|---|---|
| 2018/0204345 | A1* | 7/2018 | Motohashi | G06V 20/56 |
| 2018/0338102 | A1 | 11/2018 | Saito | |
| 2021/0051279 | A1 | 2/2021 | Tochigi | |
| 2021/0389176 | A1 | 12/2021 | Yamazaki | |
| 2022/0201182 | A1 | 6/2022 | Maekawa | |
| 2024/0406574 | A1* | 12/2024 | Saito | H04N 25/773 |
| 2024/0406598 | A1 | 12/2024 | Yokoyama | |
| 2024/0430589 | A1 | 12/2024 | Yokoyama | |
| 2024/0430590 | A1 | 12/2024 | Fujimori | |
| 2024/0430594 | A1 | 12/2024 | Fujimori | |
| 2025/0088772 | A1 | 3/2025 | Fujimori | |

* cited by examiner 21
303
310
311
312
313
314
315

202
VL
401
402
VH
node A
410
node B
411
412
113
303
414
413
415 RES1
416 RES2
418 SEL2
417 SEL1

Figure 5:
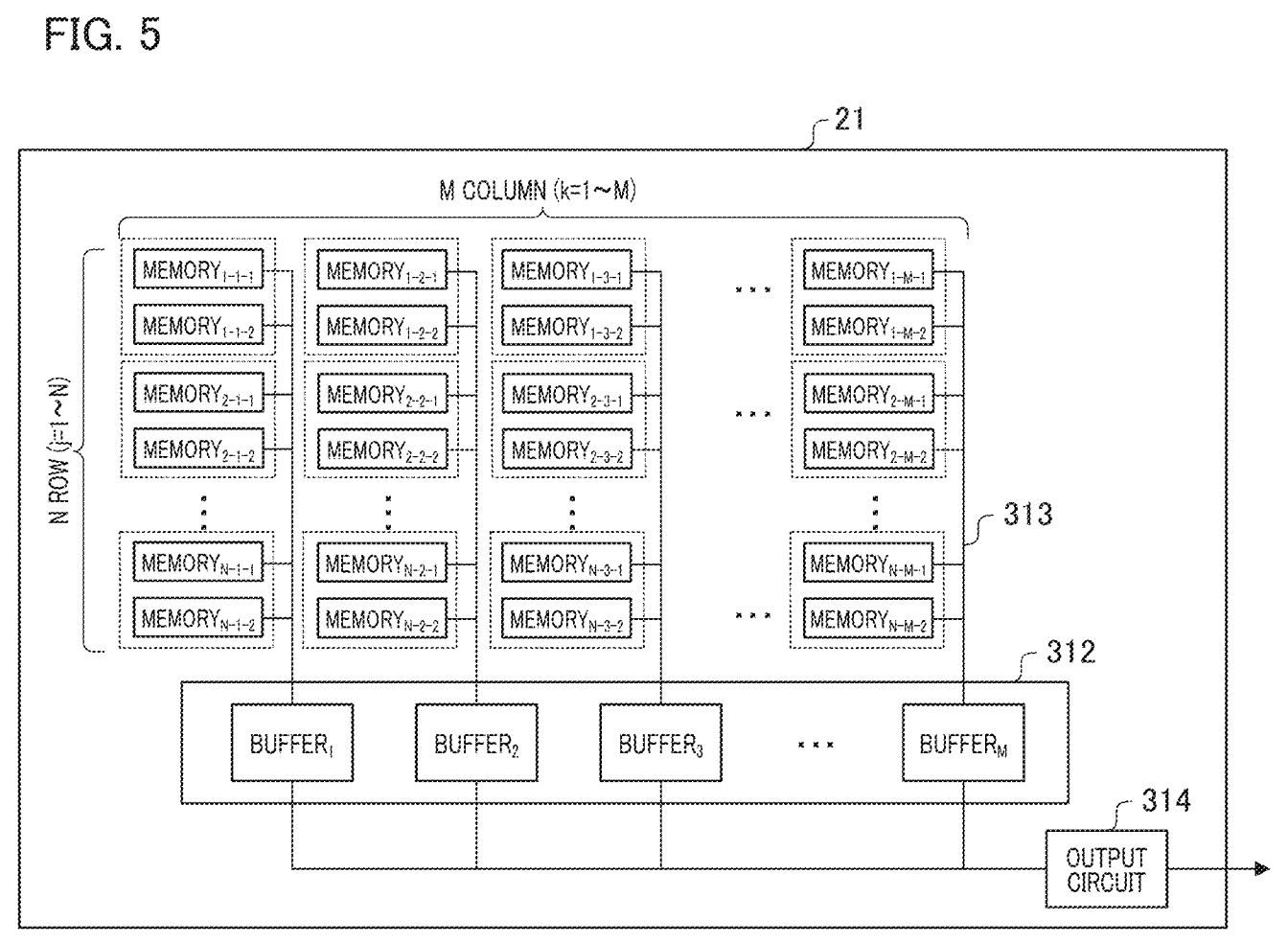

M COLUMN (k=1~M)

N ROW (j=1~N)

MEMORY$_{1-1-1}$ MEMORY$_{1-1-2}$ MEMORY$_{2-1-1}$ MEMORY$_{2-1-2}$ … MEMORY$_{N-1-1}$ MEMORY$_{N-1-2}$

MEMORY$_{1-2-1}$ MEMORY$_{1-2-2}$ MEMORY$_{2-2-1}$ MEMORY$_{2-2-2}$ … MEMORY$_{N-2-1}$ MEMORY$_{N-2-2}$

MEMORY$_{1-3-1}$ MEMORY$_{1-3-2}$ MEMORY$_{2-3-1}$ MEMORY$_{2-3-2}$ … MEMORY$_{N-3-1}$ MEMORY$_{N-3-2}$

MEMORY$_{1-M-1}$ MEMORY$_{1-M-2}$ MEMORY$_{2-M-1}$ MEMORY$_{2-M-2}$ … MEMORY$_{N-M-1}$ MEMORY$_{N-M-2}$

313

312

BUFFER$_1$ BUFFER$_2$ BUFFER$_3$ … BUFFER$_M$

314

OUTPUT CIRCUIT 700
701
ECU
702
VEHICLE CONTROL UNIT
703
DISPLAY UNIT
600
601
IMAGE FORMING OPTICAL SYSTEM
100
PHOTOELECTRIC CONVERSION ELEMENT
603
IMAGE PROCESSING UNIT
604
RECOGNITION UNIT
605
CAMERA CONTROL UNIT
606
STORAGE UNIT
607
COMMUNICATIONS UNIT

DIFFERENTIAL IMAGE

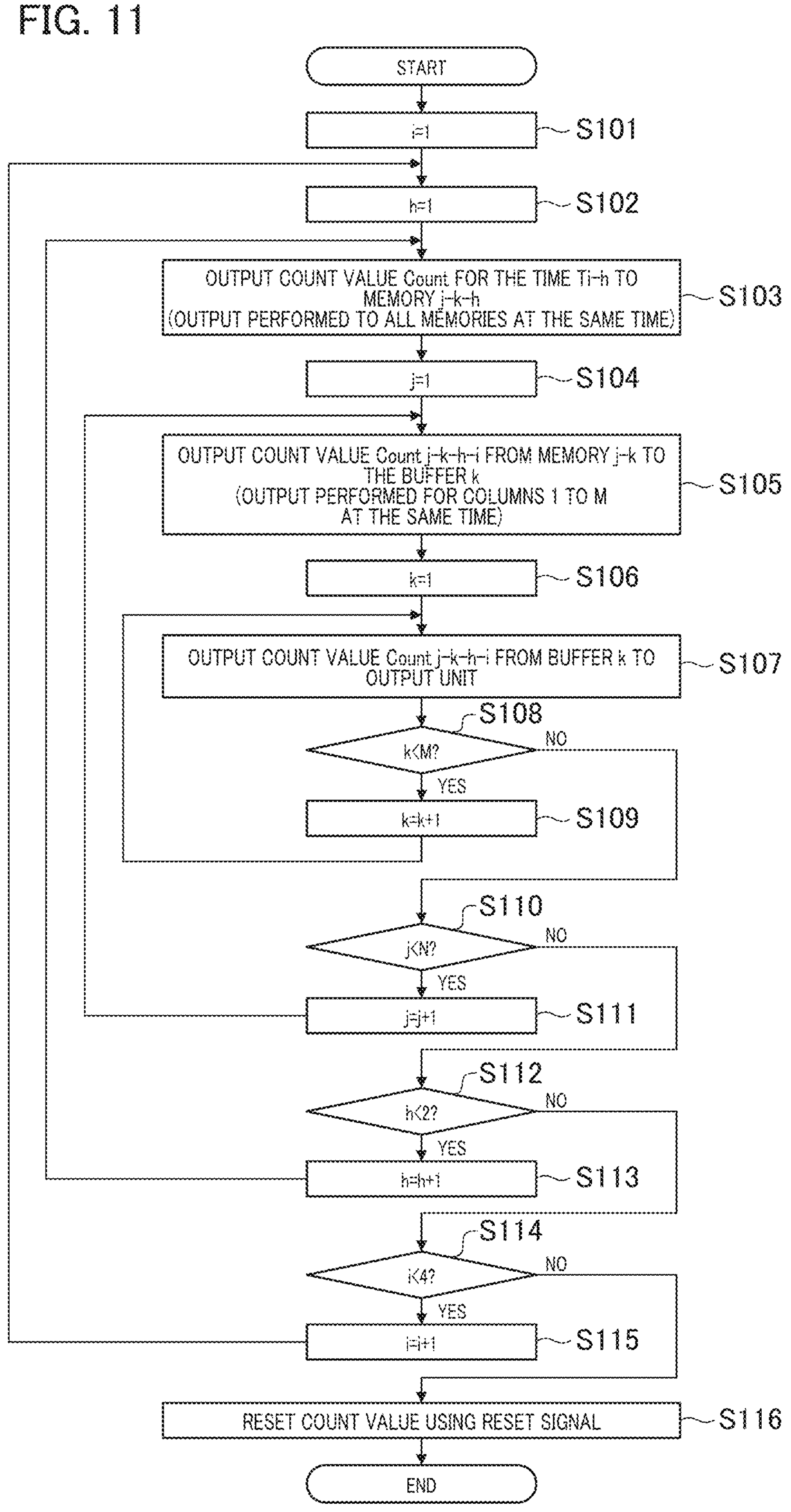
FIG. 11
START
i=1
S101
h=1
S102
OUTPUT COUNT VALUE Count FOR THE TIME Ti-h TO MEMORY j-k-h
(OUTPUT PERFORMED TO ALL MEMORIES AT THE SAME TIME)
S103
j=1
S104
OUTPUT COUNT VALUE Count j-k-h-i FROM MEMORY j-k TO THE BUFFER k
(OUTPUT PERFORMED FOR COLUMNS 1 TO M AT THE SAME TIME)
S105
k=1
S106
OUTPUT COUNT VALUE Count j-k-h-i FROM BUFFER k TO OUTPUT UNIT
S107
S108
k<M?
NO
YES
k=k+1
S109
S110
j<N?
NO
YES
j=j+1
S111
S112
h<2?
NO
YES
h=h+1
S113
S114
i<4?
NO
YES
i=i+1
S115
RESET COUNT VALUE USING RESET SIGNAL
S116
END

PHOTOELECTRIC CONVERSION DEVICE, MOVABLE APPARATUS, PROCESSING METHOD, AND STORAGE MEDIUM FOR GENERATING A DIFFERENTIAL IMAGE

BACKGROUND OF THE INVENTION

Field of the Invention

The present invention relates to technology for photoelectric conversion, image processing, and the like in a photoelectric conversion device.

Description of the Related Art

In recent years, photoelectric conversion devices that digitally count a number of photons that become incident on avalanche photodiodes (APDs), and then output a count value from a pixel to serve as a photoelectrically converted digital signal have been developed. In addition, Japan Patent Number 7223070 discloses a configuration in which, in a photoelectric conversion device having APDs, it is possible to output a plurality of video images for which the accumulation periods overlap with each other, and continuous image capturing thereby becomes possible even in low illumination.

Incidentally, vehicle-mounted camera systems with the goal of autonomous driving and collision prevention prevent accidents in advance by performing recognition processing on images as rapidly as possible, and controlling a vehicle based on these recognition results. In the image capturing element of a vehicle-mounted camera, recognition processing for images during normal sensor drive is performed with the unit of a frame, and for example, in the case of a frame rate of 30 fps, recognition processing is performed every 33.3 ms. When the frame rate is low, the speed of the recognition processing also becomes proportionately slow, and therefore, for example, in the case of a vehicle, the recognition processing for a subject that has run out into the road becomes slower in relation to the speed of the subject, and the recognition precision is lowered.

In order to inhibit flicker due to traffic lights, vehicle-mounted cameras often use periods of a fixed period (for example, 11 ms) or greater as the accumulation period for a pixel signal, and in particular, under low illumination, bright image capturing is performed by making the accumulation period longer. However, when the accumulation period is long, this makes it easier for blur to occur for rapidly moving subjects, and it is possible that the recognition precision will be lowered. In order to inhibit such subject blur, increasing the frame rate is considered. However, normal recognition processing requires a fixed processing time, and therefore, there is a possibility that the processing will not be completed in time.

The present disclosure provides a technology that is able to suppress decreases in the image recognition precision.

A photoelectric conversion device according to one embodiment of the present disclosure has a plurality of pixels, a control unit, and a generating unit. Each pixel of the plurality of pixels includes a sensor unit that emits a pulse at a frequency corresponding to a photon reception frequency, a first counter and a second counter that count a number of the pulses, and a first memory that stores the count value for the first counter, and a second memory that stores the count value for the second counter. The control unit controls the plurality of pixels such that during a read-out operation for the count values that have been accumulated during a plurality of different accumulation periods within a full frame period from each of the first counter and the second counter, a count value for a first accumulation period is read out before an end time of a second accumulation period that is longer than the first accumulation period. In addition, the control unit performs control such that a read-out timing for each accumulation period becomes different between the first counter and the second counter. The generating unit generates a differential image based on a difference in signals corresponding to the count values that are output from the first memory and the second memory respectively.

Further features of the present disclosure will become apparent from the following description of exemplary embodiments (with reference to the attached drawings).

BRIEF DESCRIPTION OF THE DRAWINGS

FIG. 5 is a diagram showing relationships between memory boards and buffers according to an embodiment.

FIG. 10 is a diagram showing an example of images for two frames that have been generated via two counter circuits, and a differential image thereof.

FIG. 11 is a flowchart showing a drive example of a photoelectric conversion element according to an embodiment.

DESCRIPTION OF THE EMBODIMENTS

Hereinafter, with reference to the accompanying drawings, favorable modes of the present disclosure will be described using Embodiments. In each diagram, the same reference signs are applied to the same members or elements, and duplicate descriptions will be omitted or simplified.

Figure 1:
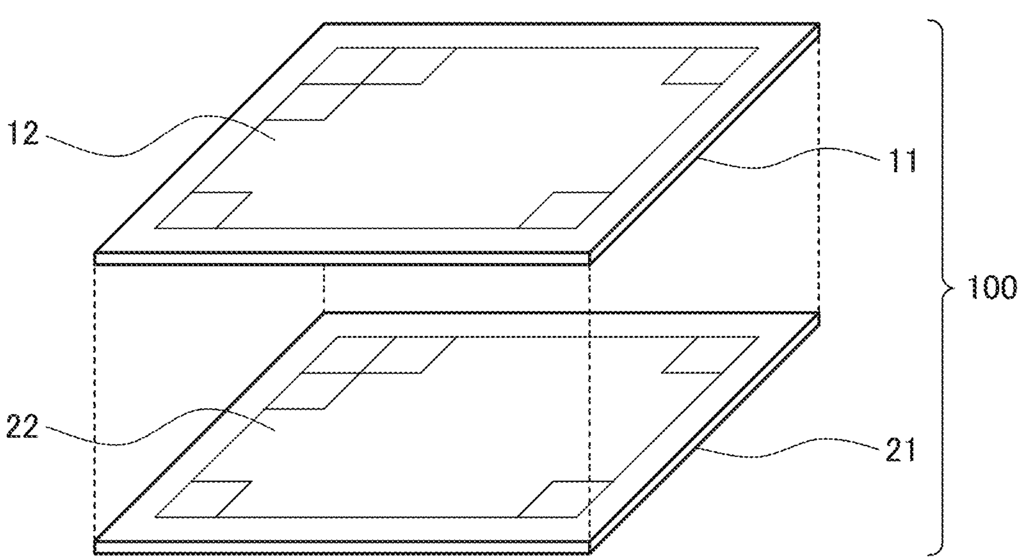
FIG. 1 is a diagram showing a configurational example of a photoelectric conversion element according to an embodiment.

FIG. 1 is a diagram showing a configurational example of a photoelectric conversion element according to a first embodiment. Below, an explanation will be given using an example of a photoelectric conversion device that has a so-called laminated structure, in which a photoelectric conversion element 100 is laminated by two substrates of a sensor substrate 11 and a circuit substrate 21, and is electrically connected thereto.

However, this may also be a so-called non-laminated configuration, in which the configurations that are included in the sensor substrate and the configurations that are included in the circuit substrate are arranged on the same semiconductor. The sensor substrate 11 comprises a pixel region 12. The circuit substrate 21 comprises a circuit region 22 that performs processing on a signal that has been detected in the pixel region 12.

Figure 2:
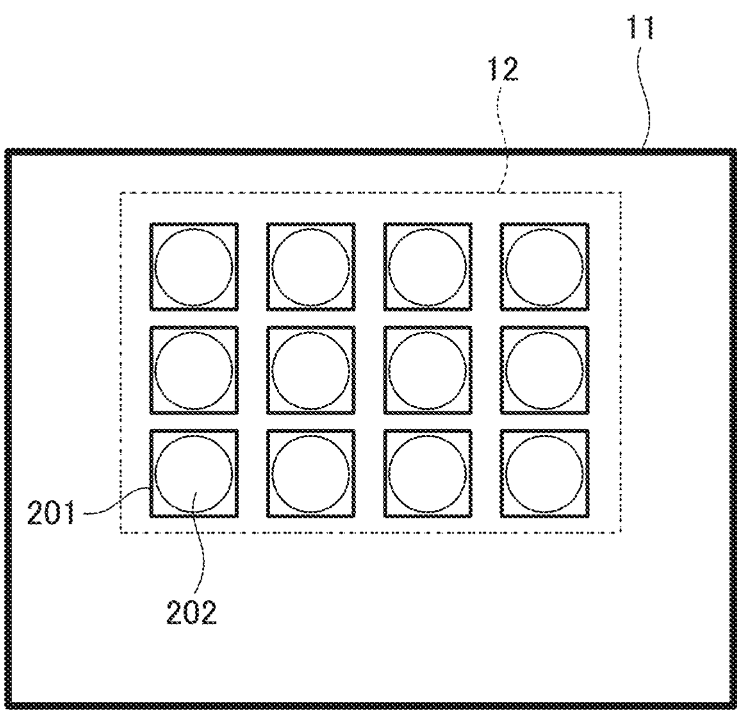
FIG. 2 is a diagram showing a configurational example of a sensor substrate.

FIG. 2 is a diagram showing a configurational example of the sensor substrate 11. The pixel region 12 of the sensor substrate 11 comprises pixels 201 of which a plurality has been two-dimensionally arranged across a plurality of rows and columns. The pixels 201 are provided with photoelectric conversion units 202 that comprise avalanche photodiodes (referred to below as APDs).

In this context, the photoelectric conversion unit 202 functions as a sensor unit that emits a pulse at a frequency corresponding to a photon reception frequency. Note that the number of rows and the number of columns for the pixel array that forms the pixel region 12 is not particularly limited.

Figure 3:
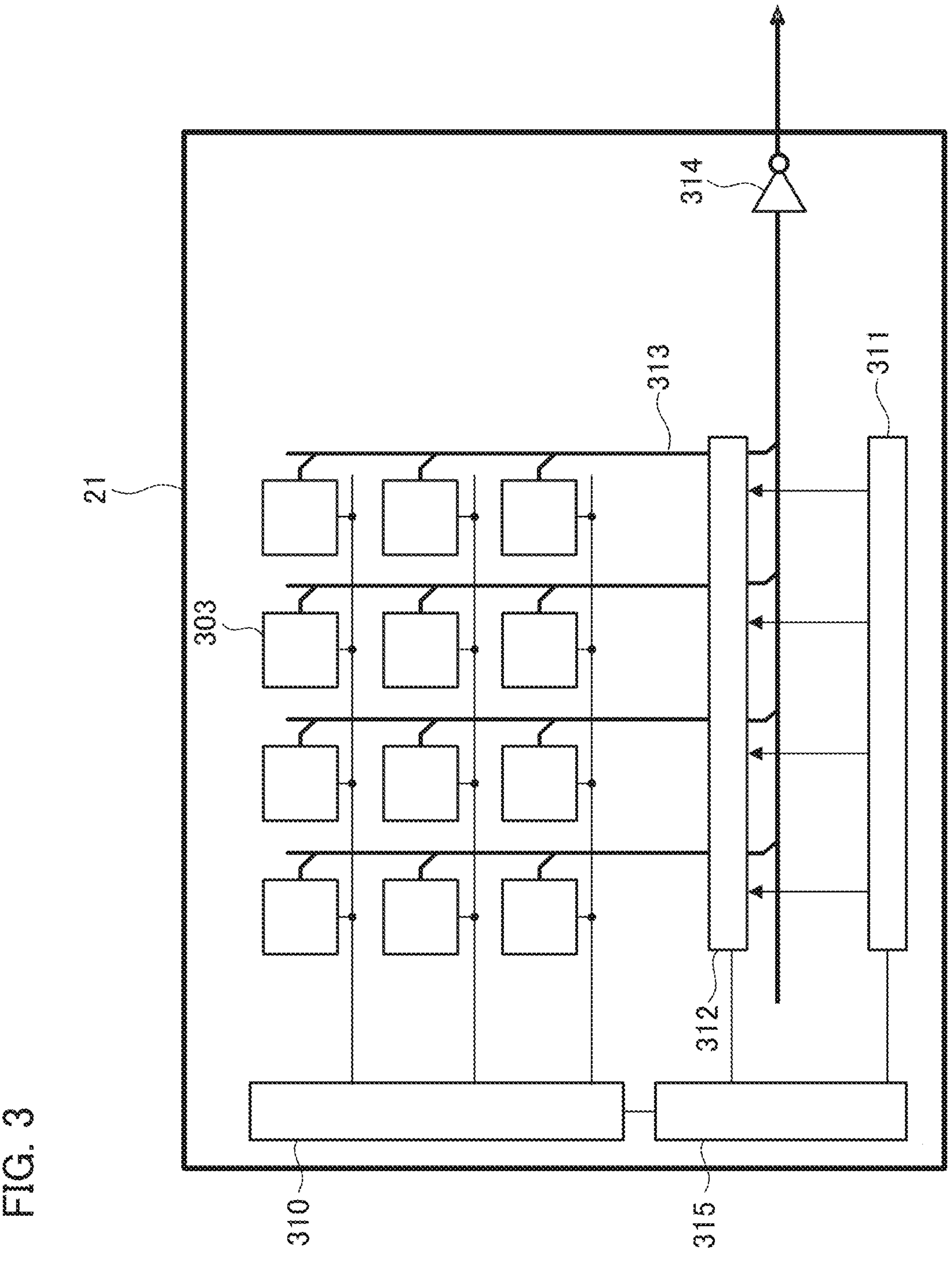
FIG. 3 is a diagram showing a configurational example of a circuit substrate.

FIG. 3 is a diagram showing a configurational example of the circuit substrate 21. The circuit substrate 21 has a signal processing circuit 303 that processes a charge that has been photoelectrically converted by the photoelectric conversion unit of FIG. 2, a read-out circuit 312, a control pulse generating unit 315, a horizontal scanning circuit 311, a vertical signal line 313, a vertical scanning circuit 310, and an output circuit 314.

The vertical scanning circuit 310 receives a pulse that has been supplied from the control pulse generating unit 315, and supplies the control pulse to the plurality of pixels that have been arranged in the row direction in order. The logical circuits of a shift resistor and an address decoder are used in the vertical scanning circuit 310.

The signals that have been output from the photoelectric conversion units 202 for each pixel are processed in each signal processing circuit 303. The signal processing circuit 303 is provided with counters (counter circuit 411, and counter circuit 412 of FIG. 4), and memories (memory circuit 413, and memory circuit 414 of FIG. 4) that are to be described below, and the memories hold digital values. The horizontal scanning circuit 311 inputs a control pulse that selects each column in order to the signal processing circuit 303 in order to read out signals from the memories for each pixel in which the digital signals have been held.

Signals from the signal processing circuits 303 for the pixels for the row that has been selected by the vertical scanning circuit 310 are output to the vertical signal line 313. The signals that have been output to the vertical signal line 313 are output to outside of the photoelectric conversion element 100 via the read-out circuit 312 and the output circuit 314. The read-out circuit 312 has a plurality of buffers built in that have been connected to the vertical signal line 313.

As is shown in FIG. 2, and FIG. 3, the plurality of signal processing circuits 303 are disposed in a region that overlaps with the pixel region 12 in the planar view. In addition, the vertical scanning circuit 310, the horizontal scanning circuit 311, the read-out circuit 312, the output circuit 314, and the control pulse generating unit 315 are disposed so as to overlap between the edge of the sensor substrate 11 and the edge of the pixel region 12 in the planar view.

That is, the sensor substrate 11 has the pixel region 12 and a non-pixel region that has been disposed around the pixel region 12. In addition, the vertical scanning circuit 310, the horizontal scanning circuit 311, the read-out circuit 312, the output circuit 314, and the control pulse generating unit 315 are disposed in a region that overlaps with the non-pixel region in the planar view.

Note that the arrangement of the vertical signal line 313, and the arrangement of the read-out circuit 312 and the output circuit 314 are not limited to the example that has been shown in FIG. 3. For example, the vertical signal line 313 may also be disposed so as to extend in the direction of the rows, and the read-out circuit 312 may also be disposed at the end of the extension of the vertical signal line 313. In addition, one signal processing circuit 303 does not necessarily need to be provided for each photoelectric conversion unit, and this may also be made a configuration in which a plurality of photoelectric conversion units share one signal processing circuit, and signal processing is performed in order.

Figure 4:
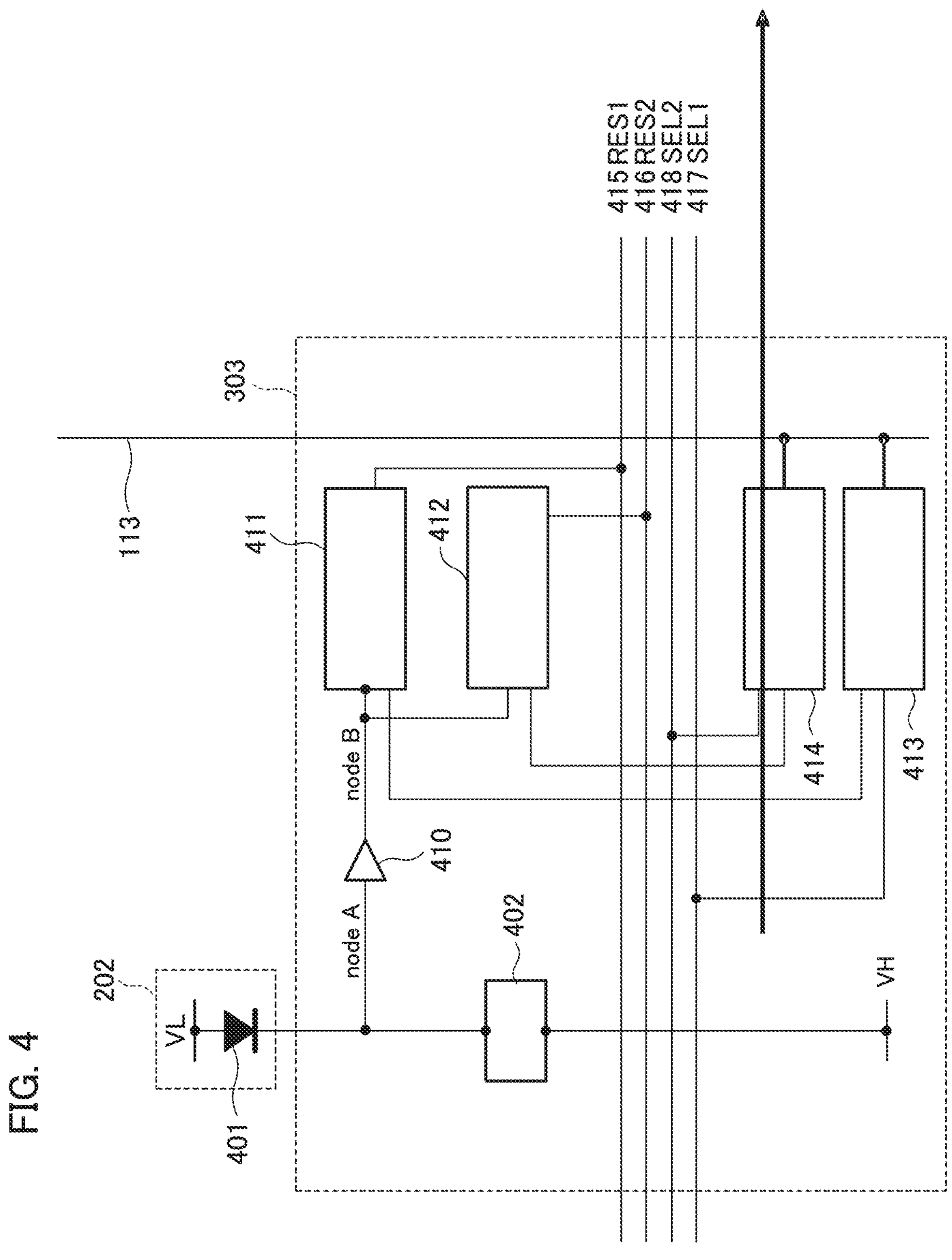
FIG. 4 is a diagram that shows, from among FIG. 2, and FIG. 3, a pixel, and an equivalent circuit for a signal processing circuit corresponding to the pixel.

FIG. 4 is a diagram showing, from among FIG. 2, and FIG. 3, a pixel 201, and an equivalent circuit of the signal processing circuit 303 corresponding to the pixel 201.

The APD 401 that is included in the photoelectric conversion unit 202 generates a charge pair according to the incidence of light due to photoelectric conversion. One node from among the two nodes of the APD 401 is connected to a power source that supplies a drive voltage VL (a first voltage). In addition, the other node from among the two nodes of the APD 401 is connected to a power source that supplies a drive voltage VH (a second voltage) that is higher than the voltage VL.

In FIG. 4, the one node of the APD 401 is an anode, and the other node of the APD is a cathode. A reverse bias voltage is supplied to the anode and the cathode of the APD 401 such that the APD 401 performs avalanche multiplication operations. By making this a state in which such a voltage has been supplied, the charge caused by the incidence of light causes avalanche multiplication, and an avalanche current is generated.

Note that in a case in which a reverse bias voltage is supplied, there is a Geiger mode in which the APD is made to operate at a voltage difference for which the voltage difference for the anode and the cathode is larger than the breakdown voltage, and a linear mode in which the APD is made to operate at a voltage difference for which the voltage difference for the anode and the cathode is around the vicinity of or less than the breakdown voltage. An APD that is made to operate in a Geiger moder is called a SPAD. In the case of a SPAD, the drive voltage VL (the first voltage) is, for example, −30V, and the drive voltage VH (the second voltage) is, for example, 1V.

The signal processing circuit 303 has a quenching element 402, a waveform shaping unit 410, a counter circuit 411, a counter circuit 412, a memory circuit 413, and a memory circuit 414. The quenching element 402 is connected to the power source that supplies the drive voltage VH and one node from among the anode and the cathode of the APD 401.

The quenching element 402 functions as a load circuit (a quenching circuit) at the time of signal amplification by avalanche multiplication, and has operations that control the voltage supplied to the APD 401 and control the avalanche multiplication (a quenching operation). In addition, the quenching element 402 has operations that return the voltage that is supplied to the APD 401 to the drive voltage VH by flowing an electric current for the amount that is voltage dropped during the quenching operation (a recharging operation).

FIG. 4 shows an example in which the signal processing circuit 303 has the waveform shaping unit 410, the counter circuit 411, the counter circuit 412, the memory circuit 413, and the memory circuit 414 in addition to the quenching element 402. Note that the counter circuit 411 functions as, for example, a first counter, and the counter circuit 412 functions as, for example, a second counter. In addition, the counter circuit 411 and the counter circuit 412 function together as a counter unit. The memory circuit 413 functions as a first memory, and the memory circuit 414 function as a second memory. In addition, the memory circuit 413, and the memory circuit 414 function together as a memory unit.

The waveform shaping unit 410 shapes voltage changes in the cathode of the APD 401 that are obtained at the time of photon detection, and outputs a pulse signal. For example, an inverter circuit is used as the waveform shaping unit 410. Although in FIG. 4, an example has been shown in which one inverter is used as the waveform shaping unit 410, a circuit in which a plurality of inverters has been connected in series may also be used, or any other circuit having a waveform shaping effect may also be used.

The counter circuit 411 counts the number of pulses that have been output from the waveform shaping unit 410, and holds the counted value. In addition, when a control pulse RES 1 has been provided via a drive line 415, the signal that has been held in the counter circuit 411 is reset. In this context, the counter circuit 411 generates a signal based on a difference between count values for the start time and the end time of an accumulation period for a signal. In the same manner, the counter circuit 412 counts a number of pulses that have been output from the waveform shaping unit 410, and holds the count value. In addition, when a control pulse RES 2 has been supplied via a drive line 416, the signal that has been held in the counter circuit 412 is reset. In this context, the counter circuit 412 generates a signal based on a difference between count values between a start time and an end time of an accumulation period for a signal.

A control pulse SEL is supplied to the memory circuit 413 from the vertical scanning circuit 310 of FIG. 3 via a drive line 417 of FIG. 4 (not shown in FIG. 3), and the counter circuit 411 and the vertical signal line 313 switch between being electrically connected and not connected. The memory circuit 413 functions as a memory that temporarily stores count values of the counter circuit 411, and outputs an output signal for a pixel from the counter circuit 411 to the vertical signal line 313.

In the same manner, a control pulse SEL2 is supplied to the memory circuit 414 from the vertical scanning circuit 310 of FIG. 3 via a drive line 418 (not shown in FIG. 3), and the counter circuit 412 and the vertical signal line 313 switch between being electrically connected and not connected. The memory circuit 414 functions as a memory that temporarily stores a count value from the counter circuit 412, and outputs an output signal of a pixel from the counter circuit 412 to the vertical signal line 313.

Note that a switch such as a transistor or the like may also be placed between the quenching element 402 and the APD 401, and between the photoelectric conversion unit 202 and the signal processing circuit 303, and this may be used to switch their electric connections on and off. In the same manner, a switch such as a transistor or the like may also be used to electrically switch the supply of the drive voltage VH or the drive voltage VL that are supplied to the photoelectric conversion unit 202 on and off.

FIG. 5 is a diagram showing the relationship between the memory circuits and the buffers according to the Present Embodiment. FIG. 5 shows a state in which the memory circuit 413 and the memory circuit 414 have been put together as one inside of the signal processing circuit 303 of FIG. 3 and have been arranged in N rows and M columns, and this is shown such that each memory circuit is a memory 1-1-1 to a memory N-M-h. The memory circuit 413 holds the value h=1, and the memory circuit 414 holds the value h=2. In addition, the buffer 1 to buffer M in FIG. 5 show the buffers that are included in the read-out circuit 312 in FIG. 3. The output circuit 314 in FIG. 5 corresponds to the output circuit 314 in FIG. 3.

Figure 6:
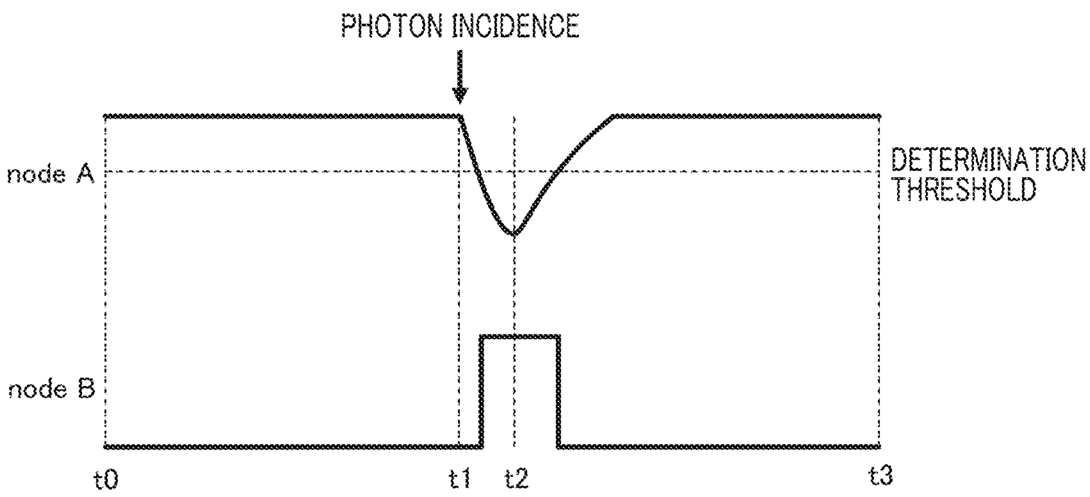
FIG. 6 is a diagram that schematically shows a relationship between operations of an APD and an output signal.

FIG. 6 is a diagram that schematically shows the relationship between the operations of the APD 401 and the output signal. The input side of the waveform shaping unit 410 is made a nodeA, and the output side of the waveform shaping unit 410 is made a nodeB. During the time t0 to the time t1, the potential difference VH-VL is applied to the APD 401. At the time t1, upon photons becoming incident on the APD 401, avalanche multiplication occurs in the APD 401, an avalanche multiplication current flows through the quenching element 402, and the voltage for the nodeA is lowered.

Upon the voltage drop amount further increasing and the potential difference that is being applied to the APD 401 becoming smaller, as at the time t2, the avalanche multiplication for the APD 401 is stopped, and it becomes such that the voltage level for the nodeA will not drop below a fixed value.

After this, during the time from the time t2 to the time t3, a current that compensates for the voltage drop amount is flowed through the nodeA from the voltage VL, and at the time t3, the nodeA becomes statically determinate at its original potential level. At this time, the portions of the output waveform in the nodeA that have exceeded a specific threshold are waveform shaped by the waveform shaping unit 410, and output as the pulse signal in the nodeB.

Figure 7:
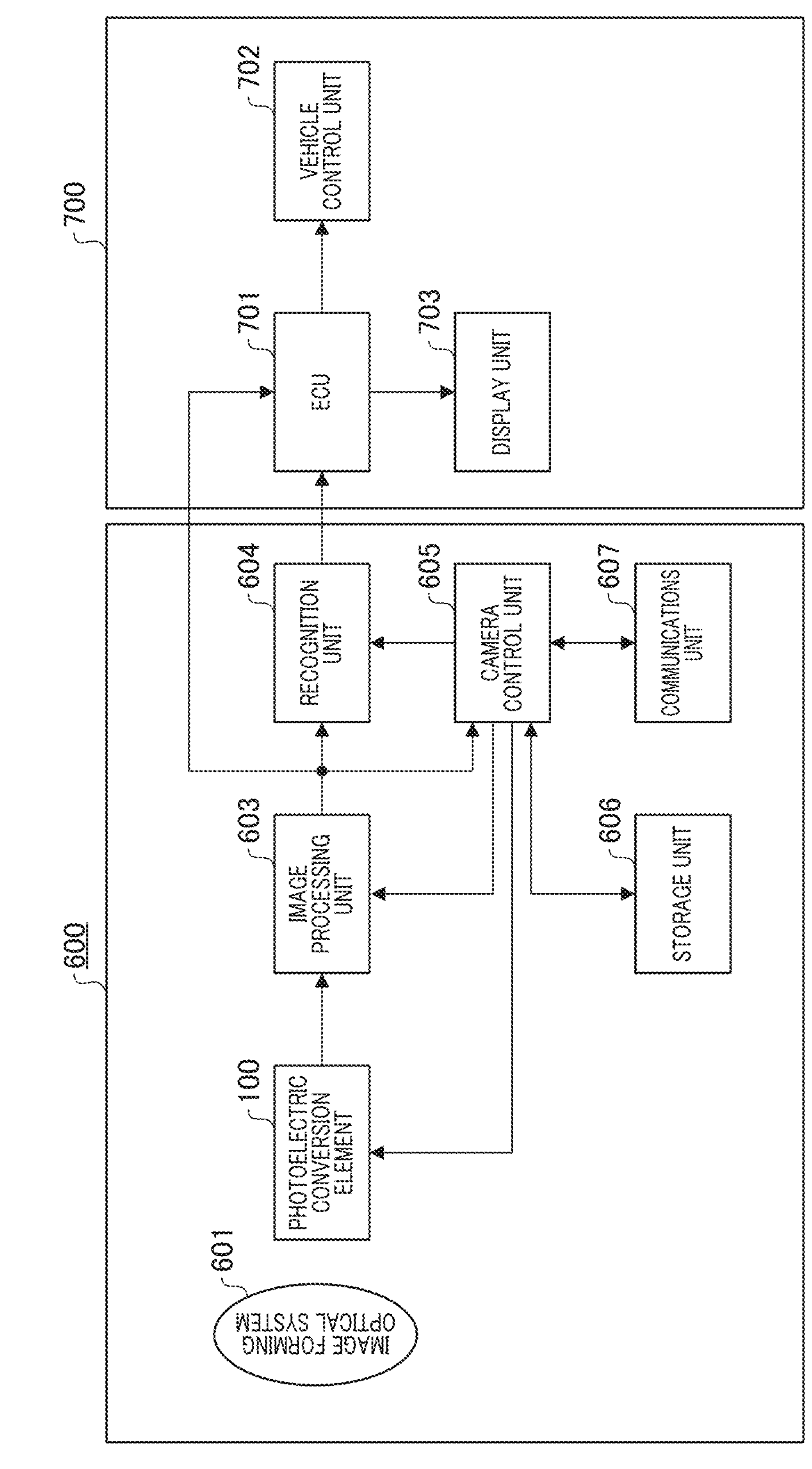
FIG. 7 is a functional block diagram for a photoelectric conversion device and a movable apparatus according to an embodiment.

Next, a photoelectric conversion device 600 and a movable apparatus 700 of the Present Embodiment will be explained. FIG. 7 is a functional block diagram showing the photoelectric conversion device 600 and the movable apparatus 700 according to the Present Embodiment. Note that a portion of the functional blocks that are shown in FIG. 7 are realized by computers that are not shown but that are included in the photoelectric conversion device 600 and the movable apparatus 700 executing computer programs that have been stored on memories serving as storage mediums, which are also not shown.

However, it may also be made such that a portion or the entirety thereof are realized by hardware. As the hardware, an application specific-integrated circuit (ASIC), a processor (a reconfigurable processor, a DSP) or the like can be used. In addition, each of the functional blocks that are shown in FIG. 7 do not need to be housed in the same body, and may also be configured by separated devices that have been connected to each other by a signal path. Note that the above explanation in relation to FIG. 7 also applies to FIG. 8, which will be explained below.

The photoelectric conversion device 600 has the photoelectronic conversion element 100 that was explained in FIG. 1 to FIG. 6, an image forming optical system 601, an image processing unit 603, a recognition unit 604, a camera control unit 605, a storage unit 606, a communications unit 607, and the like. The photoelectric conversion element 100 is configured by the avalanche photodiodes for photoelectrically converting an optical image, which were explained in FIG. 1 to FIG. 6.

The photoelectric conversion device 600 of the Present Embodiment is loaded onto the movable apparatus 700, and is configured such that a camera unit that comprises a set of the image forming optical system 601 and the photoelectric conversion element 100 captures images of, for example, at least one direction from among the front direction, the rear direction, and the side direction of the movable apparatus.

Note that a plurality of camera units may also be provided to the movable apparatus 700.

Figure 8:
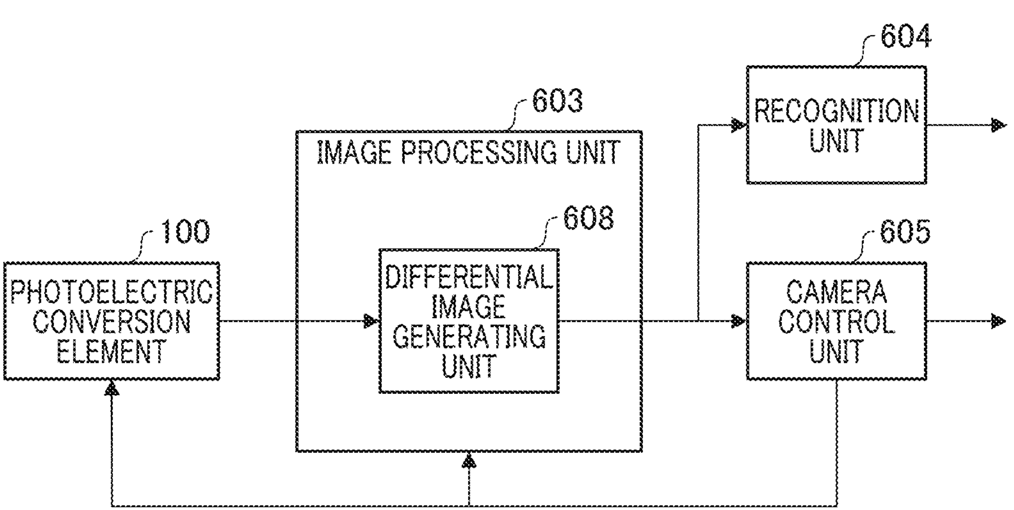
FIG. 8 is a block diagram showing an example primarily of a functional configuration of an image processing unit according to an embodiment.

FIG. 8 is a block diagram showing a configurational example of primarily the image processing unit 603. The image processing unit 603 has a differential image generating unit 608. The differential image generating unit 608 functions as a generating unit that is configured to generate differential images based on images that have been output from the photoelectric conversion element 100.

The image processing unit 603 performs, as additional processing, image processing on an image signal that has been acquired from the photoelectric conversion element 100 such as, for example, black level correction, gamma curve adjustment, noise reduction, digital gain adjustment, de-mosaic processing, data compression, or the like, and generates a final image signal. Note that in a case in which the photoelectric conversion element 100 has an on-chip color filter such as RGB or the like, it is preferable that the image processing unit 603 performs processing such as white balance correction, color conversion, and the like.

In addition, the output from the image processing unit 603 is supplied to the recognition unit 604, an ECU (electric control unit) 701 of the movable apparatus 700, and the camera control unit 605. The recognition unit 604 recognizes surrounding people, vehicles, and the like by performing image recognition based on the image signal, and generates warnings or the like according to necessity.

Note that although in the Present Embodiment, an explanation is given using an example in which the movable apparatus 700 is, for example, an automobile, the movable apparatus may also be any apparatus that is movable, such as an airplane, a train, a ship, a drone, an AGV, a robot, or the like.

The camera control unit 605 houses a CPU that functions as a computer and a memory on which a computer program has been stored, and the CPU performs control of each unit of the photoelectric conversion device 600 by executing the computer program that has been stored on the memory.

Note that the camera control unit 605 functions as a control unit, and control of the length of the accumulation periods for each frame of the photoelectric conversion element 100, control of the number of times accumulation is performed, accumulation, and the timing of a control signal CLK or the like are performed via, for example, a control pulse generating unit of the photoelectric conversion element 100.

The storage unit 606 includes, for example, storage mediums such as a memory card, a hard disk, or the like, and is able to store and read out an image signal. The communications unit 607 is provided with a wireless or wired interface, and outputs the image signal that has been generated to outside of the photoelectric conversion device 600, along with receiving each type of signal from outside of the photoelectric conversion device.

The ECU 701 houses a CPU that serves as a computer and a memory on which a computer program has been stored, and the CPU performs control of each unit of the movable apparatus 700 by executing the computer program that has been stored on the memory.

The output of the ECU 701 is supplied to a vehicle control unit 702 and a display unit 703. The vehicle control unit 702 functions as a movement control unit that performs the drive, stopping, directional control, and the like of a vehicle that is serving as a movable apparatus based on the output of the ECU 701. In addition, the display unit 703 functions as a display unit that includes, for example, display elements such as a liquid crystal device, an organic EL, or the like, and is provided to the movable apparatus 700. Note that the vehicle control unit 702 that serves as a movement control unit controls the operations of the movable apparatus based on, in particular, the results of recognition processing using an output signal of the photelectric conversion element 100.

The display unit 703 displays images that have been acquired from the photoelectric conversion element 100, and each type of information relating to the travel state or the like of the vehicle, to an operator of the movable apparatus 700 by using, for example, a GUI based on the output from the ECU 701.

Note that the image processing unit 603 and the recognition unit 604 and the like in FIG. 7 do not necessarily need to be loaded onto the movable apparatus 700, and for example, may also be provided to an external terminal or the like that has been provided separately from the movable apparatus 700 for remotely controlling the movable apparatus 700, or for monitoring the travel of the movable apparatus.

Figure 9:
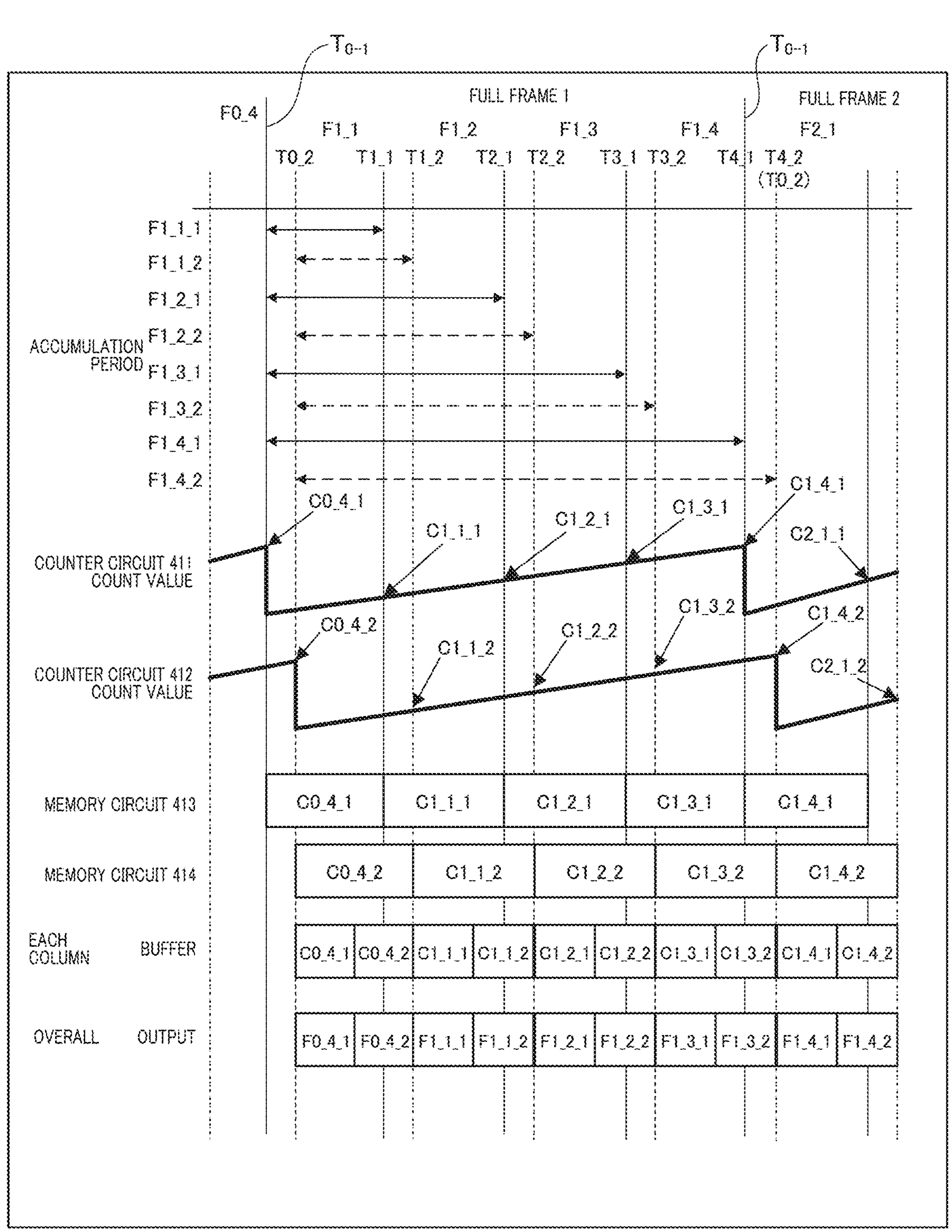
FIG. 9 is a diagram for explaining a photoelectric conversion method according to a camera control unit according to an embodiment.

FIG. 9 is a diagram explaining a photoelectric conversion method by the camera control unit 605 according to the Present Embodiment. In this context, in particular, an operation for reading out signals (count values) that have been accumulated during a plurality of different accumulation periods within a full frame period from each of the counter circuit 411 and the counter circuit 412 will be explained.

In the Present Embodiment, photoelectric conversion is periodically performed at, for example, 30 frames per second (the time length of one frame is 33.3 m), and this one frame for which the length is 33.3 ms is divided into four. That is, as is shown in FIG. 9, a frame 1 (a full frame 1) is segmented into the equal periods (8.33 ms) of frame 1_1, frame 1_2, frame 1_3, and frame 1_4. In the Present Embodiment, one frame with a length of 33.3 ms is referred to as a full frame, and a segment of a full frame that has been segmented into four is referred to as a frame. In addition, in the following explanation, with respect to cases in which a number has been attached to the word "frame", "frame" is written as "F", and for example, "frame 1_1" is written as "F1_1", and the like.

In addition, in the Present Embodiment, F1_1 is configured by F1_1_1 and F1_1_2, which are two frames for which the accumulation periods overlap. In the same manner, F1_2, F1_3, and F1_4 are each configured by two frames for which the accumulation periods overlap, respectively F1_2_1 and F1_2_2, F1_3_1 and F1_3_2, and F1_4_1 and F1_4_2. F1_1_1, F1_2_1, F1_3_1, and F1_4_1 are frames that are generated via the counter circuit 411. In contrast, F1_1_2, F1_2_2, F1_3_2, and F1_4_2 are frames that are generated via the counter circuit 412.

F1_1_1 has an accumulation period from the starting time T0_1 for F1 until the time T1_1, and F1_1_2 has an accumulation period from the time T0_2 until the time T1_2, wherein the length of each of the accumulation periods is the same.

F1_2_1 has an accumulation period from the time T0_1 until the time T2_1, and F1_2_2 has an accumulation period from the time T0_2 until the time T2_2, wherein the length of each of the accumulation periods is the same.

F1_3_1 has an accumulation period from the time T0_1 until the time T3_1, and F1_3_2 has an accumulation period from the time T0_2 until the time T3_2, wherein the length of each of the accumulation periods is the same.

In addition, F1_4_1 has an accumulation period from the time T0_1 until the time T4_1, and F1_4_2 has an accumulation period from the time T0_2 until the time T4_2, wherein the length of each of the accumulation periods is the same.

The starting times of F1_1_1, F1_2_1, F1_3_1, and F1_4_1, are the same, and are all T0_1. In addition, the starting times of F1_1_2, F1_2_2, F1_3_2, and F1_4_2 are the same, and are all T0_2.

The reset of the counter circuit 411 is performed during the time T0_1 (T4_1), which is the terminus of the full frame period, by the above-described control pulse RES 1. The time T4_1 is the start time T0_1 of F2_1_1, the next full frame 2.

In addition, the reset of the counter circuit 412 is performed during the time T0_2 (T4_2), which is the terminus of the full frame period, by the above-described control pulse RES 2. The time T4_2 is the start time T0_2 of the next full frame 2, F2_1_2.

During the time of the terminus of each of F1_1, F1_2, F1_3, and F1_4, each count value is read out from the counter circuit 411, and the counter circuit 412. Specifically, during the times T1_1, T2_1, T3_1, and T4_1, the count values C1_1_1, C1_2_1, C1_3_1, and C1_4_1 are read out respectively from the counter circuit 411. In addition, during the times T1_2, T2_2, T3_2, and T4_2, the count values C1_1_2, C1_2_2, C1_3_2, and C1_4_2 are read out respectively from the counter circuit 412.

That is, each accumulation period ends during the timing of the read out of each count value from both the counter circuit 411 and the counter circuit 412. The read-out timing for each accumulation period is different for the counter circuit 411 and the counter circuit 412. For example, the read-out timing (second timing) for the count value for F1_1, which is the time T1_2, is delayed from the time T1_1, which is a read-out timing (a first timing), by a time less than, for example, the shortest accumulation period (for F1_1). In addition, the same also applies to the relationship between T2_2 and T2_1, the relationship between the time T3_2 and T3_1, and the relationship between T4_2 (T0_2) and T4_1 (T0_2).

The count values C_1_1_1, C1_2_1, C1_3_1, and C1_4_1 that have been read out are temporarily stored in the memory circuit 413.

In addition, the count values C1_1_2, C1_2_2, C1_3_2, and C1_4_2 that have been read out are temporarily stored in the memory circuit 414.

In addition, the signals for one row that have been temporarily stored in both the memory circuit 413 and the memory circuit 414 are output sequentially from the photoelectric conversion element 100 via the buffers of the read-out circuit 312, and are input to the image processing unit 603.

In this manner, according to the Present Embodiment, the count value C1_1_1 corresponding to the signal that has been accumulated during the period F1_1_1 is read out during the time T1_1 to the time T2_1. In addition, the count value C1_2_1 corresponding to the signal that has been accumulated during the period for F1_1_2 is read out during the time T1_2 to the time T2_2. That is, the signals that have been accumulated during each period for F1_1_1, and F1_1_2 are both output up until the end of each of the accumulation periods F1_2_1, and F1_2_2, which are longer than these periods. After this, in the image processing unit 603, the differential image generating unit 608 subtracts each pixel value for F1_1_1 from the pixel values for F1_1_2, and ternarizes the calculated value using the smallest positive, negative, or 0 2 bit value. The image that has been ternarized is output to serve as a differential image, and this differential image is processed in the recognition unit 604. Therefore, it is possible to rapidly perform image recognition.

In the same manner, the count values C1_2_1, and C1_2_2, that correspond to the signals that were accumulated during both of the periods F1_2_1, and F1_2_2 are each read out during the times T2_1 to T3_1, and T2_2 to T3_2. Next, in the same manner, the count values corresponding to each of the signals that have been accumulated during each of the periods F1_3_1, F1_3_2, F1_4_1, and F1_4_2 are read out up until the end of each accumulation period that is longer than these periods. In addition, in the same manner that has been described above, a differential image is generated by the differential image generating unit 608 based on the image signals that have been read out, and then image recognition is performed in the recognition unit 604.

Figure 10:
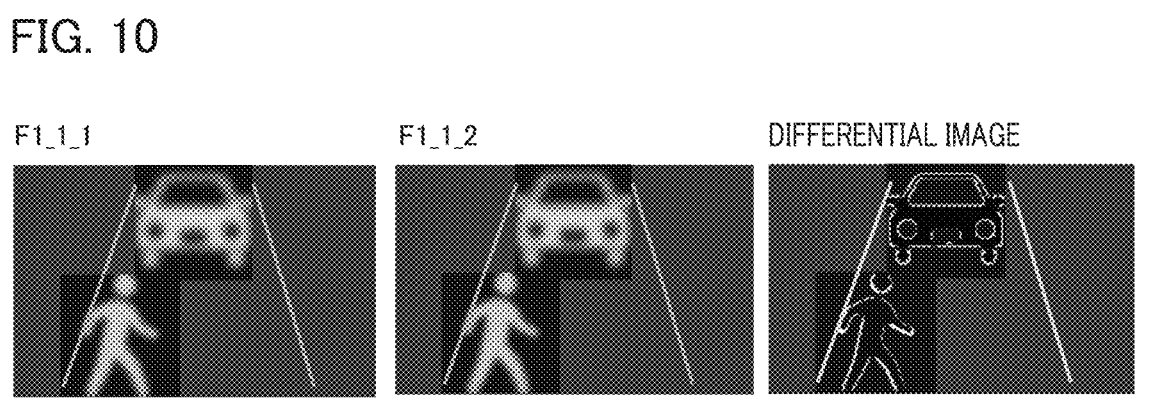

FIG. 10 is a diagram showing an example of an image with two frames that has been generated via the two counter circuits, the counter circuit 411, and the counter circuit 412, and a differential image thereof. The differential image generating unit 608 is able to decrease subject blur by generating a differential image that has been generated from two frames for which the accumulation periods (exposure periods) are the same length and for which the accumulation periods overlap, such as F1_1_1, and F1_1_2. Therefore, it is possible to capture a clear image of the contours of a fast-moving subject regardless of the length of the exposure time.

From here, attention will be paid to an accumulation operation that is performed via one counter circuit 411 (or the counter circuit 412), and the operations and effects thereof will be explained.

The photoelectric conversion element 100 according to the Present Embodiment performs an accumulation operation for a first accumulation period and a second accumulation period within one frame. In addition, the first accumulation period is shorter than the second accumulation period, and the camera control unit 605 performs control such that the signal that is generated during the first accumulation period is output between the time from the end of the first accumulation period until the end of the second accumulation period.

In addition, in the Present Embodiment, the first accumulation period and the second accumulation period overlap, and the first accumulation period and the second accumulation period start at the same time. Furthermore, if for example, the second accumulation period is made the accumulation period for F1_4_1 (or F1_4_2), the end time of the second accumulation period will become the end of the full frame, and the second accumulation period will become an integer multiple of the first accumulation period. That is, intervals for the read-out timings for the count values for each accumulation period are fixed, and the end time of the second accumulation period coincides with the end time for the full frame.

However, it is not necessary for the second accumulation period to be an integer multiple of the first accumulation period. That is, it is not necessary for the intervals for the read-out timings for each accumulation period to be fixed. It is sufficient if the second accumulation period is longer than the first accumulation period, and the end of the second accumulation period is after the end of the first accumulation period.

That is, an image with a short accumulation period and an image with a long accumulation period are created, the timing at which the short accumulation period finishes is made faster than the timing at which the long accumulation period finishes, and as soon as the short accumulation period finishes this image is output to the recognition unit 604 that will be described below. In addition, a subject is recognized based on at least the signal that is generated during the first accumulation period. The recognition unit that serves as a recognition means recognizes a subject based on at least the signal that is generate during the first accumulation period.

Therefore, whereas conventionally, image recognition could not be performed until one frame (one full frame) had elapsed, in the Present Embodiment, it is possible to perform image recognition after at the shortest a ¼ frame period, and for example, when a movable apparatus is moving at a high speed, it is possible to rapidly recognize obstacles and the like. Therefore, it is possible for the movable apparatus to rapidly brake. Conversely, it becomes possible for the movable apparatus to avoid obstacles early on.

Note that in the images with long accumulation periods, the contrast can be increased, and therefore, these can be used as display use images. That is, the images with short accumulation periods are suitable for rapid subject recognition, and the images with long accumulation periods are suitable as display use images. In this manner, the display apparatus of the Present Embodiment displays the signal that is generated during at least the second accumulation period as an image.

In addition, the Present Embodiment uses APDs, and therefore, different than for a CMOS sensor, the charge that has been accumulated is not deteriorated by read outs. The accumulation periods can also be overlapped. In addition, there is no read out noise, and therefore, even if the accumulation for one time is read out multiple times, the original signal does not deteriorate. Up until now, an explanation has been given focusing on an accumulation operation that is performed via one counter circuit 411 (or the counter circuit 412), and the operations and effects thereof.

FIG. 11 is a flow chart showing a drive example of the photoelectric conversion element 100 in the Present Embodiment. The processing for each step of the flowchart in FIG. 11 is performed in order by the CPU or the like that serves as a computer inside of the camera control unit 605 executing a computer program that has been stored on the memory.

During step S101, the CPU sets i=1. In the Present Embodiment, the values that i can take are 1 to 4, and correspond to each of the four frames into which one full frame has been divided.

Next, during step S102, the CPU sets h=1. As will also be described below, the values that h can take are 1, and 2, which correspond to the counter circuit 411, and the counter circuit 412.

During step S103, the CPU outputs the count value Count (Ti_h) for the counter circuit h during the time Ti_h to the memory (j-k-h). In the case of i=1, this operation corresponds to the operation for the times T1_1, and T1_2 in FIG. 9.

When h=1, the counter circuit h indicates the counter circuit 411, and when h=2, the counter circuit h indicates the counter circuit 412. In addition, when h=1, the memory (j-k-h) indicates the memory circuit 413, and when h=2, the memory (j-k-h) indicates the memory circuit 414. That is, during step S103, when h=1, the count value is output from the counter circuit 411 to the memory circuit 413, and when h=2, the count value is output from the counter circuit 412 to the memory circuit 414.

During step S104, the CPU sets j=1 (the first row of the plurality of pixels). Next, during step S105, the CPU outputs the count value Count (j-k-h-i) from the memory (j-k-h) from FIG. 5 to the buffer. At this time, the count value Count (j-k-h-i) for the columns 1 to M are output to the buffers at the same time. This operation corresponds to an operation for taking in the count values for one row of FIG. 5 (the count values that have been stored in each of the memories 1-1-1, 1-1-2, 1-2-1, 1-2-2 . . . 1-M-1, and 1_M_2) into the buffers at the same time.

During step S106, the CPU sets k=1 (the first column of the plurality of pixels). In addition, during step S107, the CPU outputs the count value Count (j-k-h-i) for the buffer k to the output circuit 314. This operation corresponds to an operation for reading out a signal from a buffer 1 from the left-most column in the read-out circuit 312 of FIG. 5 (each of the count values that have been stored in the memories 1-1-1, 1-1-2, 2-1-1, 2-1-2 . . . . N-1-1, and N-1-2) to the output circuit 314.

During step S108, the CPU determines whether or not k<M, and if this is Yes, during step S109, the CPU increases the value of k by making this k=k+1, and the processing returns to step S107. This operation corresponds to an operation for reading out the signals from a buffer two for the second column from the left of FIG. 9 to the read-out circuit.

In a case in which No has been determined during step S108, that is, in a case in which k=M, this means that the readout from the read-out circuit of the signals from the buffer M for the Mth column in the read-out circuit 312 has been completed. In this case, during step S110, the CPU determines whether or not j<N. In the case of Yes during step 110, the CPU increases the value of j by one by setting j=j+1, and the processing returns to step S105. This corresponds to an operation for starting the read out for the next row.

In the case in which No has been determined during step S110, this means that the read out has been completed for all of the rows, and therefore, during step S112, the CPU determines whether or not h<2. In a case in which Yes has been determined during step S112, the CPU increases the value of h by one by setting h=h+1, and the processing returns to step S103. In the case in which No has been determined during step S112, this means that the read out for the count values during the time Ti-1, and the time Ti-2 has been completed, and therefore, during step S114, the CPU determines whether or not i<4. In the case that Yes has been determined during step S114, during step S115, the CPU increases the value of i by one by setting i=i+1, and the processing returns to step S102.

In the case in which No has been determined during step S114, this means that the read out during the time T4_1 (T0_1), and T4_2 (T0_2) has been completed. That is, during step S116, the counter circuit 411 is reset by the reset signal (the control pulse RES 1) at the time of the time T4_1, and in addition, the counter circuit 412 is reset by the reset signal (the control pulse RES 2) at the time of the time T4_2. This operation corresponds to an operation for resetting the counter circuit 411 during the time T4_1 in FIG. 9, and an operation for resetting the counter circuit 412 during the time T4_2. In the above manner, it is possible to read out the signals that have been accumulated in the photoelectric conversion element 100 in order.

In the above manner, according to the Present Embodiment, the accumulation results for a time that is shorter than one full frame period are read out during one full frame period, and recognition processing is performed for each accumulation result that is obtained. It is thereby possible to realize a low delay during recognition processing.

In addition, in the Present Embodiment, the read-out timings for the count values for each accumulation period are different for the counter circuit 411 and the counter circuit 412, and therefore, count values that each hold signals for the timing differences between these two are respectively stored in the memory circuit 413 and the memory circuit 414. In addition, the differential image generating unit 608 generates a differential image based on the differences for these signals, and therefore, it is possible to reduce subject blur that becomes more likely to occur when the movable apparatus is moving at a high speed. In this manner, the recognition unit 604 is able to perform image recognition on a differential image that has been ternarized and that has a reduced subject blur. That is, recognition processing is performed on an image for which the necessary bit number is smaller than that for a color image, and therefore, the processing load for the image recognition is lightened by reducing the amount of data, and the processing speed is increased. It thereby becomes possible to recognize a subject that is moving at a high speed, and even in a case in which the subject is moving at a high speed, the recognition precision therefor can be maintained. That is, it is possible to inhibit decreases in the recognition precision. In addition, in the Present Embodiment, it is possible to increase the reducing effect for the subject blur by using the accumulation results for a time that is shorter than one full frame period in the recognition processing.

Furthermore, in the recognition processing according to the Present Embodiment, moving body detection using convolution processing or a bounding box is not necessary, and therefore, there is a benefit that the recognition speed is faster than that by pattern matching and AI. In addition, in a case in which pattern matching and AI have been used in the recognition processing as well, the processing load for the recognition will be lightened by decreasing the bit number of the differential image.

Below, other embodiments of the present disclosure will be explained. For example, as is shown in FIG. 9, in the above embodiment, the shortest accumulation period (the accumulation period for the frame 1_1) was ¼ of a frame period. However, this may also be changed to, for example ⅕ of a frame period, ⅓ of a frame period, or the like.

Furthermore, even in a case in which the read-out cycle is made per each ¼ of a frame period, the counter circuit 411 and the counter circuit 412 may also be reset during the accumulation period for the frame 1_1 of FIG. 9 in accordance with the brightness of the subject, the image recognition precision, or the like. In addition, the substantial accumulation period may also thereby be made shorter than ¼ of a frame period.

Conversely, during the time T1 of FIG. 9, or the like, the counter circuit 411 and the counter circuit 412 may also be temporarily reset. It may also be made such that the count value that is readout during the time T4 is adjusted thereby.

The photoelectric conversion device 600 in the above embodiments generated a differential image and performed recognition processing on the differential image that had been generated. However, the photoelectric conversion apparatus may also have a function (a switching unit) that switches between a mode in which recognition processing is performed by generating a differential image (a first mode), and a mode in which recognition processing is performed without outputting a differential image (a second mode) according to predetermined information. The predetermined information is, for example, information such as the control information for the movable apparatus 700 and/or the movements of the subject.

A case is presumed in which the photoelectric conversion apparatus selects the first mode in a case in which, as the control information for the movable apparatus 700, the movable apparatus 700 is moving at or over a certain fixed speed, and selects the second mode in a case in which the movable apparatus 700 is moving at a speed that is less than the fixed speed. In the case of the second mode, the photoelectric conversion element may also output the signal that has been accumulated in the counter circuit 411 or the counter circuit 412. As the method for detecting the speed of the movable apparatus 700, a method is assumed such as reading each control information such as the number of rotations of the axel, the brake, the handle, and the engine (or the motor) of a vehicle, reading a value in which how much image blur there is has been turned into a number, or the like.

As the information for the movement of the subject, there is the position, speed, acceleration, movement direction, amount of blur, and the like for the subject.

A portion or the entirety of the control in the Present Embodiment may also be made so as to be realized by supplying a computer program that realizes the functions of the above-described embodiments to the photoelectric conversion device via a network or each type of storage medium. In addition, it may also be made such that this is realized by the computer (or CPU, MPU, or the like) in this photoelectric conversion device reading out and executing a program. In this case, it becomes such that this program and the storage medium on which this program has been stored configure the present disclosure.

Above, the present disclosure has been explained based on exemplary embodiments thereof. However, the present disclosure is not limited to the above-described embodiments, and various changes based on the gist of the present disclosure are possible, and these are not excluded from the range of the present disclosure.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-168578, filed Sep. 28, 2023, which is hereby incorporated by reference herein in its entirety.

What is claimed is:

1. A photoelectric conversion device comprising:

a plurality of pixels, each of which is configured to include an avalanche photodiode that generates a pulse at a frequency corresponding to a photon reception frequency, a first counter and a second counter that both count a number of the pulses, a first memory that stores count values for the first counter, and a second memory that stores count values for the second counter; and one or more hardware processors; and one or more memories storing instructions that can be executed by the one or more hardware processors, the instructions including instructions for:

controlling the plurality of pixels such that in a read-out operation for the count values that have been accumulated during a plurality of different accumulation periods within a full frame period from each of the first counter and the second counter, a count value for a first accumulation period is read out up until an end time of a second accumulation period that is longer than the first accumulation period, and to perform control such that read-out timings for each of the accumulation periods are different for the first counter and the second counter;

generating a differential image based on a difference in signals corresponding to the count values that are output from the first memory and the second memory respectively;

performing recognition processing for a subject based on an image signal that is output from the plurality of pixels; and performing switching between a first mode in which the recognition processing is performed on the differential image and a second mode in which the recognition processing is performed on an image signal that is output from the plurality of pixels without performing output processing for the differential image.

2. The photoelectric conversion device according to claim 1, wherein the instructions further include instructions for performing control such that as the timings for the read-outs, the count value for the first counter is read out at a first timing, and the count value for the second counter is read out at a second timing that is delayed from the first timing by a time less than the first accumulation period.

3. The photoelectric conversion device according to claim 1, wherein intervals between the read-out timings corresponding to each of the first counter and the second counter are fixed.

4. The photoelectric conversion device according to claim 1, wherein in each of the first counter and the second counter, the first accumulation period and the second accumulation period overlap.

5. The photoelectric conversion device according to claim 1, wherein in each of the first counter and the second counter, the first accumulation period and the second accumulation period start at the same time.

6. The photoelectric conversion device according to claim 1, wherein in each of the first counter and the second counter, an end time of the second accumulation period coincides with an end time of the full frame period.

7. The photoelectric conversion device according to claim 1, wherein the instructions further include instructions for displaying a signal that is generated during at least the second accumulation period as an image.

8. The photoelectric conversion device according to claim 1, wherein the instructions further include instructions for performing switching between the first mode and the second mode based on at least one of control information for a movable apparatus and movement information for the subject.

9. A processing method for a photoelectric conversion device that includes a plurality of pixels, each of which is configured to include an avalanche photodiode that generates a pulse at a frequency corresponding to a photon reception frequency, a counter that counts a number of the pulses, and a memory that stores count values for the counter, the method comprising:

controlling the plurality of pixels such that in a read-out operation for the count values that have been accumulated during a plurality of different accumulation periods within a full frame period from each of a first counter and a second counter, wherein the counter includes the first counter and the second counter, a count value for a first accumulation period is read out up until an end time of a second accumulation period that is longer than the first accumulation period;

performing control such that read-out timings for each of the accumulation periods are different for the first counter and the second counter;

generating a differential image based on a difference in signals corresponding to the count values that are output from a first memory and a second memory respectively, wherein the memory includes the first memory which stores the count value for the first counter and the second memory which stores the count value for the second counter;

performing recognition processing for a subject based on an image signal that is output from the plurality of pixels; and performing switching between a first mode in which the recognition processing is performed on the differential image and a second mode in which the recognition processing is performed on an image signal that is output from the plurality of pixels without performing output processing for the differential image.

10. A non-transitory storage medium storing a control program of a photoelectric conversion device that includes a plurality of pixels, each of which is configured to include an avalanche photodiode that generates a pulse at a frequency corresponding to a photon reception frequency, a counter that counts a number of the pulses, and a memory that stores count values for the counter, the control program causing a computer to perform each step of a processing method for the photoelectric conversion device, the method comprising:

controlling the plurality of pixels such that in a read-out operation for the count values that have been accumulated during a plurality of different accumulation periods within a full frame period from each of a first counter and a second counter, wherein the counter includes the first counter and the second counter, a count value for a first accumulation period is read out before an end time of a second accumulation period that is longer than the first accumulation period;

performing control such that read-out timings for each of the accumulation periods are different for the first counter and the second counter;

generating a differential image based on a difference in signals corresponding to the count values that are output from a first memory and a second memory, respectively wherein the memory includes a first memory, which stores the count value for the first counter, and a second memory that stores the count value for the second counter;

performing recognition processing for a subject based on an image signal that is output from the plurality of pixels; and performing switching between a first mode in which the recognition processing is performed on the differential image and a second mode in which the recognition processing is performed on an image signal that is output from the plurality of pixels without performing output processing for the differential image.

* * * * *